George Herbert Dowty
Inventor

By Reynolds, Beach & Christensen
Attorneys

May 3, 1955  G. H. DOWTY  2,707,604
AIRCRAFT ALIGHTING GEAR AND BRAKING MECHANISM
FOR THE WHEEL OR WHEELS THEREOF
Filed March 30, 1951  2 Sheets-Sheet 2
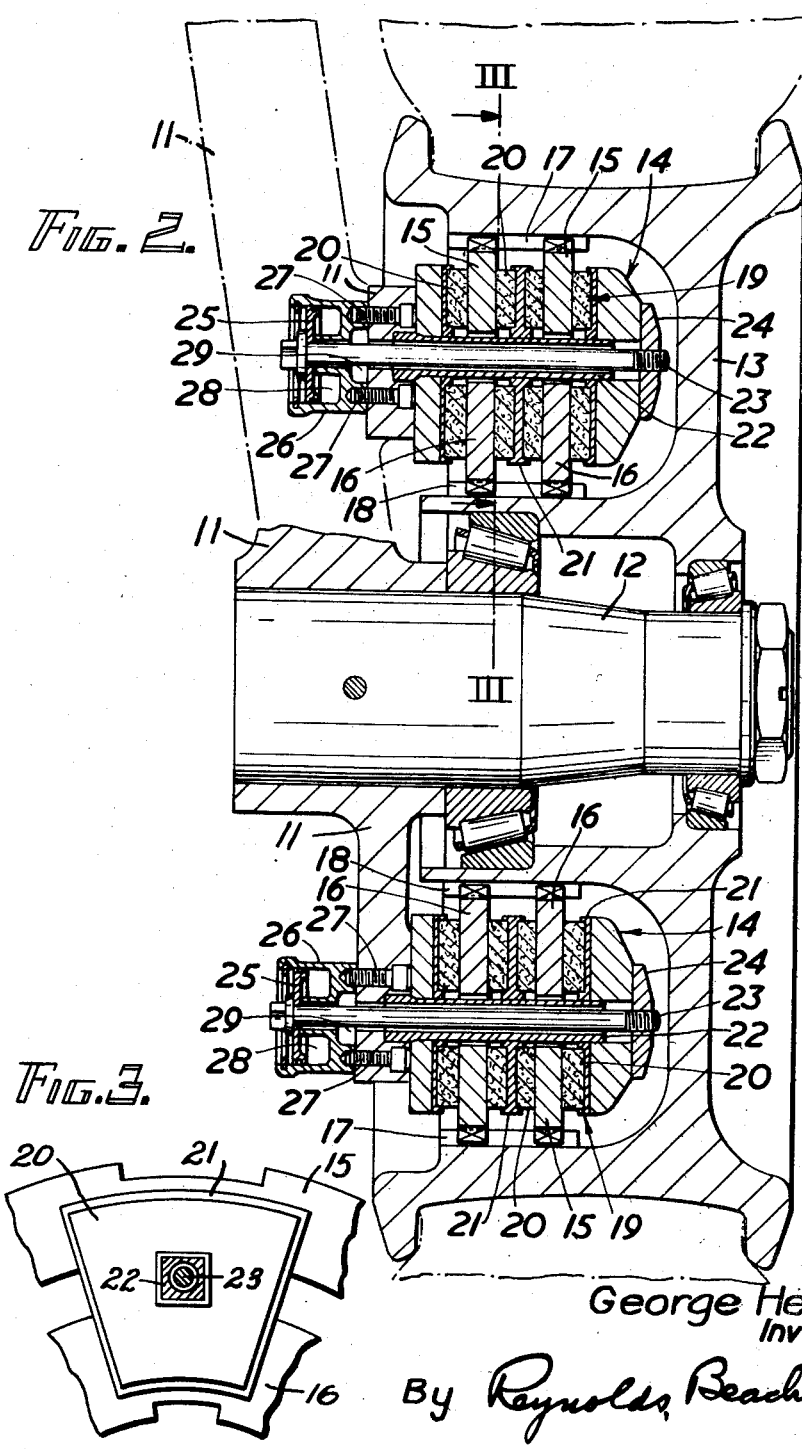
George Herbert Dowty
Inventor
By Reynolds, Beach & Christensen
Attorneys

United States Patent Office 2,707,604
Patented May 3, 1955

2,707,604

AIRCRAFT ALIGHTING GEAR AND BRAKING MECHANISM FOR THE WHEEL OR WHEELS THEREOF

George H. Dowty, Cheltenham, England, assignor to Dowty Equipment Limited, Cheltenham, England Application March 30, 1951, Serial No. 218,402

2 Claims. (Cl. 244—111)

There is a type of wheel brake, especially used on aircraft, known as a plate brake which comprises two or more annuli or disc-like members which are keyed to rotate with the wheel, and sets of brake pads arranged to engage the faces of the annuli or disc-like members, and one or more actuating cylinders, which are in effect short travel jacks, adapted to compress the assembly in order to retard the rotation of the wheel. The actuating cylinders are carried by a torque plate which has to be keyed in some way to the spindle or other fixed part of the wheel-supporting structure. The present invention is concerned with plate brakes as applied to the wheels of an aircraft undercarriage, and has among its objects simplification of construction, and reduction in overall weight.

According to this invention the torque plate of the actuating cylinder assembly or assemblies is constituted by the main supporting leg of the undercarriage, and there is no separate torque plate.

Although the brake may comprise a single actuating cylinder assembly it will generally comprise two or more such assemblies, and if two assemblies are provided, and if these are arranged at diametrically opposite parts of the brake, they will be carried by or formed in the main supporting leg at positions above and below the axis of the wheel spindle. If two or more such assemblies are arranged side by side as a group, the main supporting leg may be shaped as by having integral outward lugs in order to accommodate them above the wheel spindle.

The cylinder spaces of the cylinder assemblies may be formed within the material of the leg itself, but it is preferred to form the cylinders separately and to fit them into the leg with a surrounding air jacket in order to assist in maintaining the cylinder assemblies reasonably cool. Among other things this will help to safeguard the gland packings fitted within the assemblies.

A component of aircraft alighting gear in accordance with the invention will now be described by way of example with reference to the accompanying drawings, of which:

Figure 2 is a sectional front elevation on the line II—II of Figure 1, and

Figure 3 is a fragmentary view of a brake pad assembly on the line III—III of Figure 2.

Figure 1:
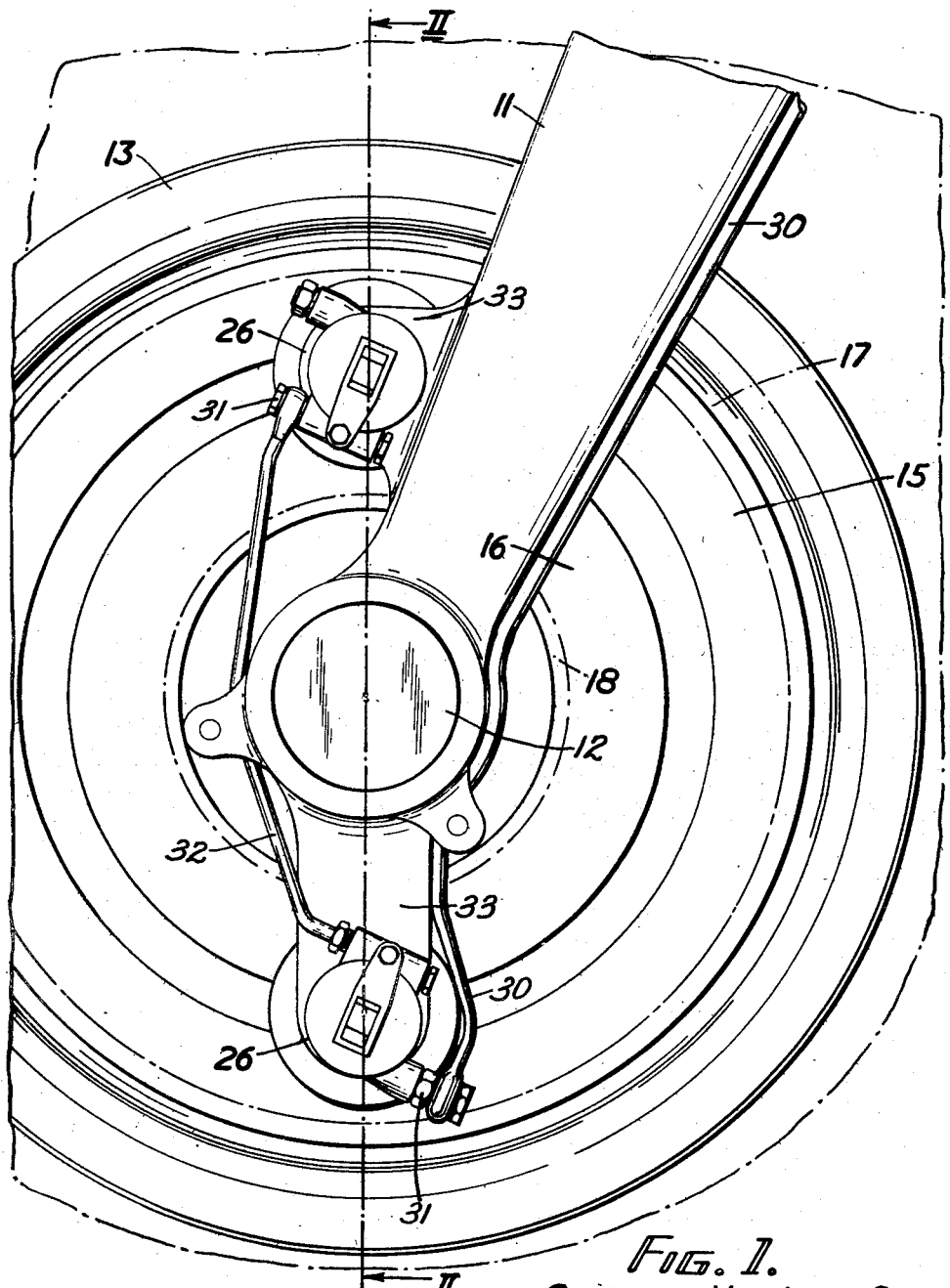
Figure 1 is a side elevation.

As shown, the main supporting leg 11 of the undercarriage component has fast thereon a spindle 12 around which is freely journalled a wheel 13 with associated braking mechanism indicated generally at 14. The braking mechanism 14 is of the type known as the plate brake type and, in the example shown, comprises two annular brake plate structures, namely an outer annular plate 15 and an inner concentric annular plate 16, the two of which constitute in effect one plate, but because they are separated they are separately splined to the wheel rim at 17 and to the wheel hub at 18 respectively. Each such annular plate may be duplicated. In the example illustrated, the braking effort is applied to the brake plates at two diametrically opposite localised areas by two brake pad assemblies 19. Each assembly 19 comprises brake pads 20 which are secured to carriers 21 which latter are a sliding fit on a rectangular guide 22 which is secured by bolts (not shown) to the leg 11. The guide 22 extends perpendicularly to the plane of the brake plate structures 15 and 16, with clearance between the inner margin of 15 and the outer margin of 16; it has a central bore through which extends a rod 23 having a pressure head 24 at one end and a piston 25 at the other end. The piston 25 operates in a cylinder 26 which might be formed as part of the leg 11, but which is preferably separate therefrom, and is secured to the leg 11 (preferably somewhat spaced therefrom by short spacer legs) by bolts 27. The bolts by means of which the guide 22 is secured to the leg 11 extend one on either side of the rod 23 in parallel with the latter. Fluid pressure for actuating the brake is conveyed through a pipe 30 to a connector 31 which opens into the space 28 of the lower of the cylinders 26, while a continuation pipe 32 leads from the latter to a second connector 31 which opens into the space 28 of the upper of the cylinders 26. When fluid pressure is applied in the space 28 in the cylinder 26 the piston 25 is moved out to the left as seen in Figure 2, and the brake assembly comprising the brake plate structures 15 and 16 and the brake pads 20 is compressed to retard the rotation of the wheel. It will be seen that the two cylinder assemblies of the brake are carried directly by the leg 11, or by lugs or extensions 33 integral therewith, which is or are suitably shaped as seats to receive them, and that the leg therefore constitutes directly the torque resisting element of the brake, thus avoiding the necessity for a separate torque plate and bolts by which the plate would have to be secured to a suitable flange on the leg, with resultant complication, cost, and added weight. The present invention affords added cleanliness with regard to the brake control conduits, though these are not shown herein.

It will be appreciated that a brake of the type in question need not have two cylinder assemblies, as one may suffice. If it does comprise two cylinder assemblies these need not be located at diametrically opposite parts of the brake as shown in the drawings, as they may be out of diametrical alignment and may be located comparatively close to one another to form a group. In such an arrangement the leg may have integral outward lugs at the front and rear respectively, in which the cylinders are formed or mounted.

The cylinder assemblies may be secured to the leg in such manner as to leave an air gap as seen at 29 in Figure 2 in order to improve the dissipation of heat.

I claim:

1. An aircraft alighting gear comprising a main support leg, a transverse spindle carried by said leg, a landing wheel mounted upon said spindle for rotation relative to said leg, said wheel being annularly recessed at its side which faces the leg, and provided with a rim and a hub defining the radial outer and inner limits of said recess, brake plate structure positioned within the wheel's recess and comprising an inner annular plate attached to said hub and extending radially outward therefrom and an outer annular plate attached to the rim of the wheel and extending radially inward and coplanar with said inner plate and spaced therefrom thereby forming an annular slot between said plates, a friction pad located within the wheel's recess, at the side of the annular plates opposite said leg, for cooperation with said annular plates and guided for shifting in a direction parallel to the axis of the wheel and spindle into and from frictional braking engagement with said annular plates, a fluid pressure cylinder mounted directly upon the leg with the axis located radially outward of the wheel's rotative axis, parallel to that rotative axis and extending intermediate said annular plates and through said slot formed therebetween, a piston shiftable axially within said cylinder and a stem extending from the piston and between said spaced apart inner and outer annular plates and through the annular slot formed therebetween, said stem being operatively connected to said friction pad, to shift the latter as stated, in accordance with the position of the piston within its cylinder.

2. An aircraft alighting gear comprising a main support leg, a transverse spindle carried by said leg, a landing wheel mounted upon said spindle for rotation relative to the leg, said support leg having a plurality of lugs integral therewith, spaced substantially equally from and distributed about the wheel's rotative axis, a fluid pressure cylinder mounted upon each of said lugs with each cylinder's axis located radially outward of and parallel to the wheel's rotative axis, said wheel being annularly recessed at its side which faces the leg, brake means comprising an annular brake plate structure received within the wheel's recess and secured to the wheel for rotation therewith, a friction pad corresponding with each of said fluid pressure cylinders and cooperating with said brake plate structure and guided for shifting in a direction parallel to the axis of the wheel and spindle into and from frictional braking engagement with said brake plate structure, to apply braking friction at angularly spaced intervals to the annular brake plate structure, and a piston shiftable axially within each of said cylinders and operatively connected to said corresponding friction pad, to shift the latter as stated, in accordance with the position of its corresponding piston within that piston's cylinder.

References Cited in the file of this patent

UNITED STATES PATENTS

| | | |
|---|---|---|
| 2,044,989 | La Brie | June 23, 1936 |
| 2,366,093 | Forbes | Dec. 26, 1944 |
| 2,376,685 | Goepfrich | May 22, 1945 |
| 2,548,008 | Franklin | Apr. 10, 1951 |
| 2,555,182 | Butler | May 29, 1951 |
| 2,581,941 | Shinn | Jan. 8, 1952 |